United States Patent [19]

Jones

[11] 4,135,824
[45] Jan. 23, 1979

[54] SCOPE FOR VIEWING THE INTERNAL SURFACE OF A BORE OR SIMILAR CAVITY

[76] Inventor: Ira D. Jones, 53170 Oakton Dr., South Bend, Ind. 46635

[21] Appl. No.: 790,392

[22] Filed: Apr. 25, 1977

[51] Int. Cl.² .............................................. G01B 11/22
[52] U.S. Cl. .................................. 356/241; 350/96.10; 356/397; 356/378
[58] Field of Search ............................... 356/171, 241; 350/96.10, 96.26; 33/125 A, 125 B

[56] References Cited

U.S. PATENT DOCUMENTS

| | | | |
|---|---|---|---|
| 3,413,067 | 11/1968 | Froio | 356/241 |
| 3,724,922 | 4/1973 | Jones | 350/96.26 |

*Primary Examiner*—John K. Corbin
*Assistant Examiner*—Matthew W. Koren
*Attorney, Agent, or Firm*—Oltsch, Knoblock & Hall

[57] ABSTRACT

A scope which is for viewing the internal surface of a bore or similar cavity and which includes a rod having a viewing end and an image transmitting end. The rod is formed of optically clear light transmitting material through which the internal surface of a bore or similar cavity at the image transmitting end of the rod is viewed from the viewing end of the rod. The transmitting end of the rod includes an optical surface paralleling the axis of the rod. A pair of circular gauging indicators are formed on the optical surface and are spaced a selected distance apart along the axial direction of the rod to permit a selected part of the internal surface of the bore to be viewed between the indicators for measuring purposes.

15 Claims, 9 Drawing Figures

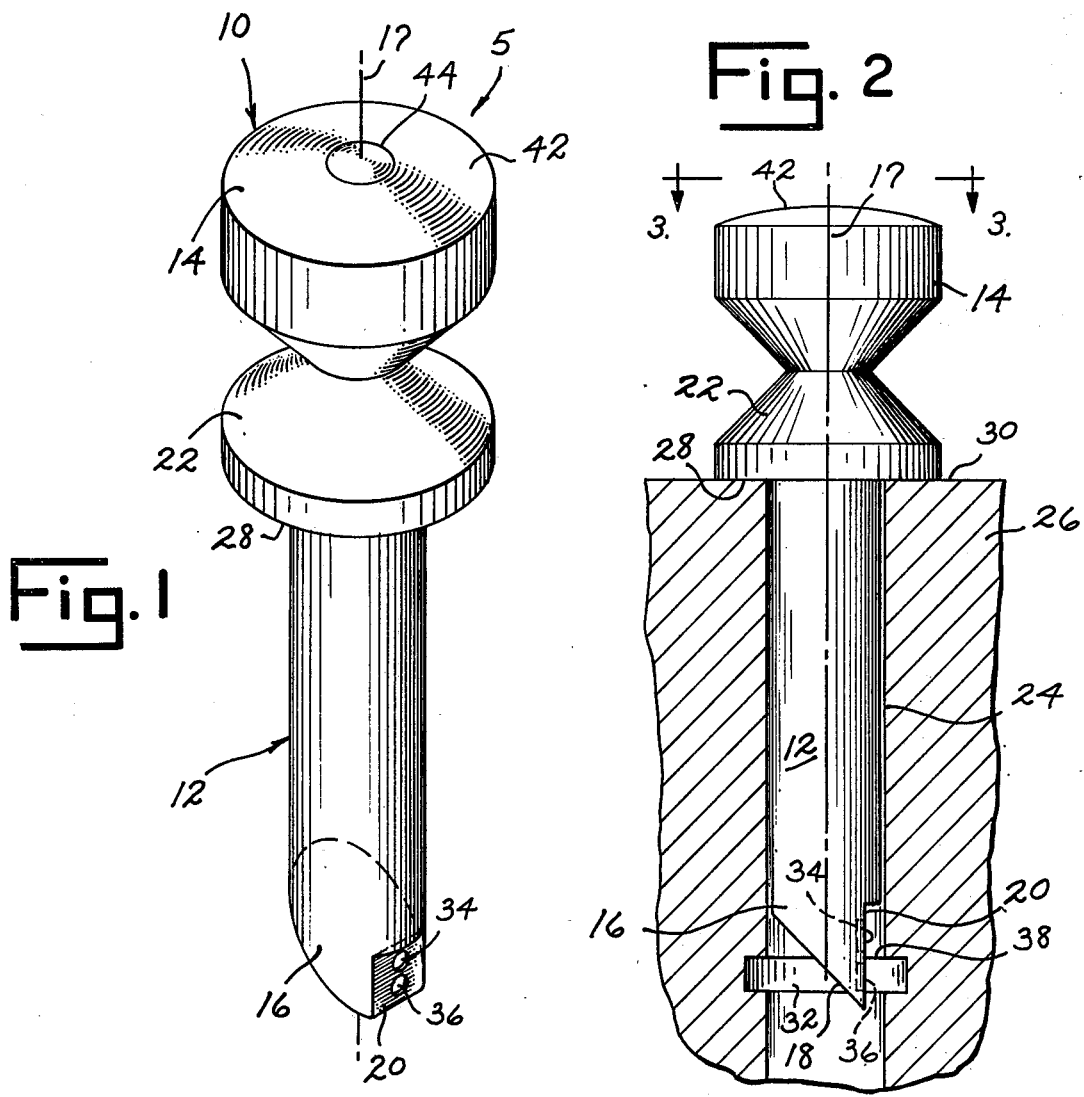
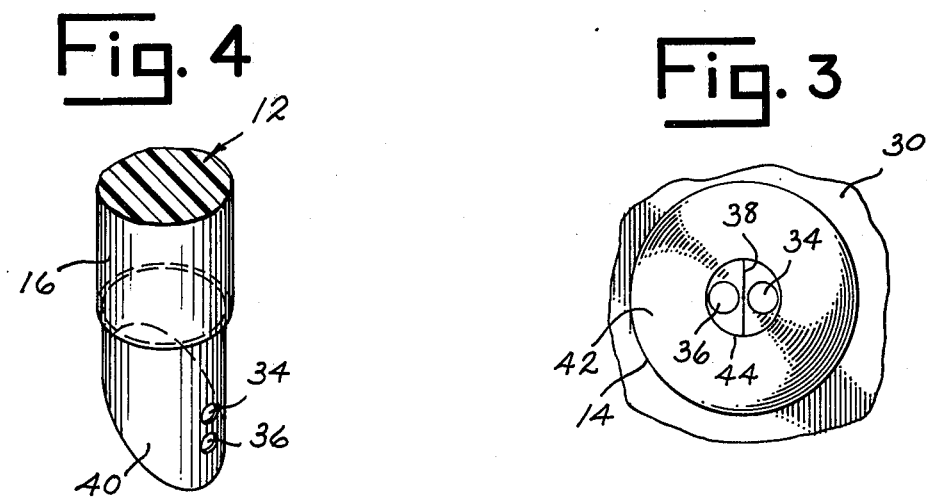

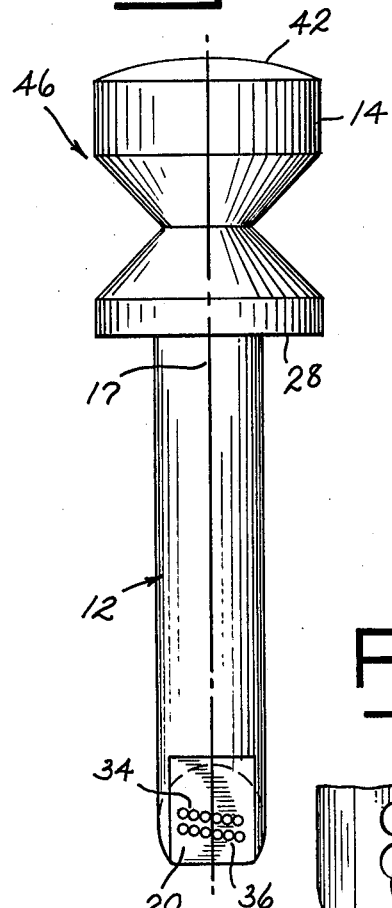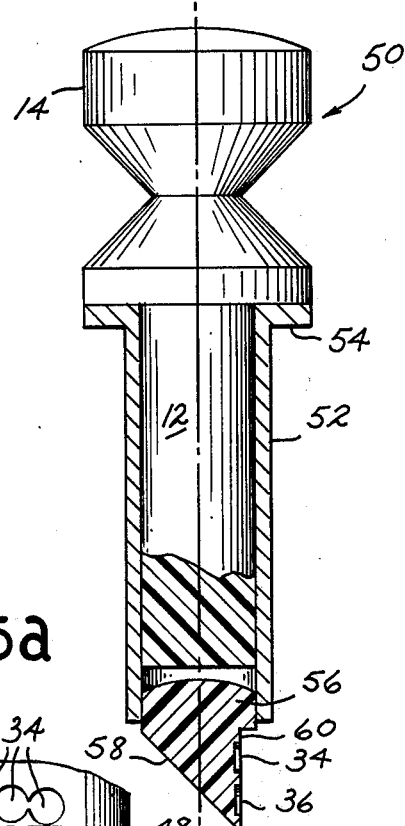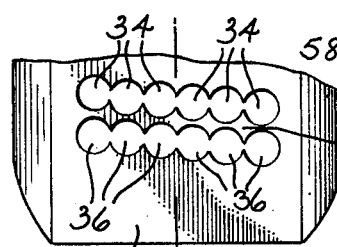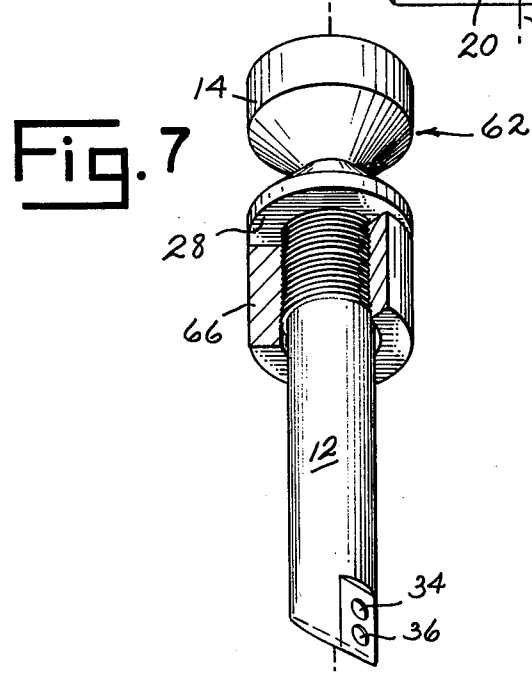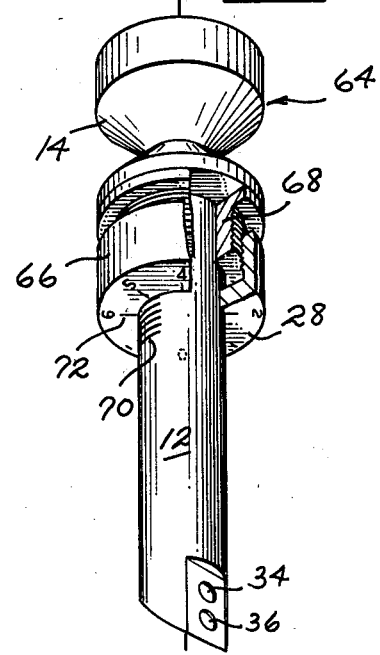

SCOPE FOR VIEWING THE INTERNAL SURFACE OF A BORE OR SIMILAR CAVITY

BACKGROUND OF THE INVENTION

This invention relates to a scope for viewing the internal surfaces of bores or similar cavities.

The scope of this invention includes a rod of optically clear material having a viewing end and an image transmitting end, and is an improvement over U.S. Pat. Nos. 3,413,067 and 3,724,922.

The image transmitting end of the scope is modified so as to permit the scope to be utilized in measuring the depth or location of grooves, recesses, shoulders, counterbores and countersinks in a work piece bore or similar cavity.

SUMMARY OF THE INVENTION

The scope of this invention includes a rod of optically clear material having a viewing end and an image transmitting end. The rod includes a shoulder part which is spacedly located from the image transmitting end.

The image transmitting end of the rod includes an optical surface which parallels the axis of the rod and through which the internal surface of a work piece bore or similar cavity into which the rod has been placed is viewed. A pair of circular gauging indicators are formed on the mentioned optical surface at the image transmitting end of the rod. The gauging indicators are spaced apart a selected distance along the axial direction of the rod.

The scope is utilized by having its rod inserted into the work piece cavity, with the shoulder part of the rod being brought to bear against the external surface of the work piece at the cavity. The internal surface of the cavity is then viewed through the viewing end of the rod with a selected object within the cavity, such as the edge of a groove, recess, shoulder, counterbore or countersink, being located between the gauging indicators upon the mentioned optical surface at the image transmitting end of the rod. In this manner the dimension between the external surface of the cavity and its selected internal surface object can be checked with accuracy or measured.

If desired, the shoulder part of the rod can be threadably or otherwise attached to the shank of the rod so as to enable the shoulder part to be shifted longitudinally along the rod. This allows the spacing from the shoulder part to the gauging indicators to be varied, thereby enabling the distance between the external surface of the work piece about the cavity and a surface object such as groove, recess, shoulder, counterbore or counterseat within the cavity to be accurately measured.

Accordingly, it is an object of this invention to provide an improved scope for viewing the internal surface of a bore or similar cavity in which the location of an internal object within the cavity, such as a groove, recess, shoulder, counterbore or countersink, can be accurately determined or verified.

Still another object of this invention is to provide an economical scope for comparatively determining the location of grooves, recesses, shoulders, counterbores, countersinks and similar surface objects within a bore or similar cavity.

And still another object of this invention is to provide an economical scope for verifying the location of a line object within a bore or similar cavity at the internal surface thereof.

Other objects of this invention will become apparent upon a reading of the invention's description.

BRIEF DESCRIPTION OF THE DRAWINGS

FIG. 1 is a perspective view of one embodiment of the scope of this invention.

FIG. 2 is an elevational view of the scope of FIG. 1 shown inserted into a bore.

FIG. 3 is a top plan view as seen from line 3—3 of FIG. 2 of the scope.

FIG. 4 is a fragmentary perspective view of the image transmitting end of the scope of FIG. 1 shown in modified form.

FIG. 5 is an elevational view of another embodiment of the scope of this invention.

FIG. 5a is an enlarged detailed view of the lower end portion of the scope of FIG. 5.

FIG. 6 is an elevational view of another embodiment of the scope of this invention showing the shank thereof in sectionalized form.

FIG. 7 is a perspective view of another embodiment of the scope of this invention showing the adjustable collar of the scope in fragmentary form for purposes of illustration.

FIG. 8 is a perspective view of another embodiment of the scope of this invention showing the adjustable collar of the scope and cooperating parts in fragmentary form for purposes of illustration.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

The embodiment of the scope illustrated in FIGS. 1-3 includes a head 10 and a shank 12. Head 10 and shank 12 are part of a rod which is formed of optically clear material, such as acrylic resin sold under the trade names Lucite and Plexiglas. Head 10 and shank 12 are coaxial, with the head including an image viewing part 14 and with the shank including an image transmitting part 16. Image transmitting part 16 includes an optical surface 18 angled 45° with respect to the axis 17 of shank 12 and an optical surface 20 which parallels the shank axis and intersects optical surface 18. Optical surface 20 is inset from the outer cylindrical surface of shank 12 for the purpose of preventing it from being scratched or marred during use of the scope.

Head 10 of scope 5 of FIGS. 1-3 also may include a frusto-conical surface 22 located below image viewing part 14. Frusto-conical surface 22 serves as a light gathering medium for transmitting light downwardly through shank 12 and onto the internal surface of the object being viewed. Use of scope 5 is illustrated in FIG. 2. The scope is shown with its shank 12 being inserted into a bore 24 in a work piece 26. Scope 5 includes a shoulder 28 which engages or rests upon the outer surface 30 of work piece 26 about the opening into bore 24. Looking downwardly through image viewing part 14 of scope 5, the internal groove 32 formed in bore 24 can be seen. The manner and operation of scope 5 as thus far described is well known in the art and is fully explained in U.S. Pat. No. 3,724,922.

Scope 5 is improved upon by the addition of two circular gauging indicators 34 and 36 formed upon optical surface 20 of the scope. Indicator 34 is selectively spaced from indicator 36, with the indicators being aligned along the axial direction of shank 12. Indicators 34 and 36 are preferably etched or colored so as to be readily visible when viewed through shank 12 from image viewing part 14 of the scope. In the illustrated embodiment, indicators 34 and 36 are accurately machined circular recesses formed in optical surface 20 of scope 5. By accurately locating indicator 34 relative to shoulder 28 along the axial direction of shank 12, the selected spacing between the indicators can be utilized as a tolerance within which a particular edge of groove 32 within bore 24 must be located to be within tolerance for work piece 26. In FIG. 3 groove 32 is shown as viewed from image viewing part 14 of scope 5 with upper edge 38 of the groove seen as extending midway between the peripheral edges of indicators 34 and 36. This would indicate that edge 38 of groove 32 is within tolerance and accurately located relative to surface 30 of work piece 26. In this manner, scope 5 acts as a comparative gauge.

Circular indicators 34 and 36 are utilized since it has been found that the human eye can more easily ascertain the tangential alignment between a straight line and an arc than the alignment between two parallel lines which would be the case if straight line indicators were utilized upon surface 20 instead of arcuate indicators 34 and 36.

In FIG. 4 image transmitting part 16 of scope 5 has been modified by being provided with a cylindrical optical surface 40 intersecting angled optical surface 18. Indicators 34 and 36 are formed in optical surface 40. Optical surface 40 is inset from the remaining surface of shank 12 of the scope so as to prevent it from being marred or scratched during use of the scope.

Outer end surface 42 image viewing part 14 of scope 5 is slightly convex and includes a sight ring 44 which is etched or otherwise scribed onto surface 42. Sight ring 44 is coaxially located relative to the axis 17 of scope shank 12 and serves to aid the user of the scope in aligning his line-of-sight with the shank axis when viewing the internal cavity surface. Sight ring 44 is particularly helpful in those scopes having short shanks in which misalignment of the line of sight through shank 12 would cause an erroneous comparison of the internal surface of the cavity and indicators 34 and 36.

Scope 46 illustrated in FIGS. 5 and 5a is like that of the construction of scope 5 illustrated in FIGS. 1-3 with the exception that sight ring 44 is not utilized upon end surface 42 of image viewing part 14 and there are a plurality of pairs of indicators 34 and 36 instead of a single pair of indicators formed upon optical surface 20 of the scope. Indicators 34 and 36 are each of a circular configuration with the spacing between each pair of indicators 34 and 36 being equal. Each pair of indicators 34 and 36 parallel the axis 17 of shank 12 of the scope with indicators 34 being located at selected varying distances from shoulder 28 of the scope so as to create an angled path 48 between the indicators extending obliquely to the axis of shank 12.

Indicators 34 and 36 of scope 46 are colored or etched upon optical surface 20 so as to render their circular outlines readily visible when the user of scope 46 peers into image viewing part 14 with the scope inserted into a bore or similar cavity. When scope 46 is inserted into a cavity with its shoulder 28 contacting the outer surface of the work piece about such cavity, the edge of the groove, recess, counterbore or countersink within the cavity which is being measured or compared will appear between one of the several pairs of indicators 34 and 36. By knowing the spacing between each pair of indicators as well as the distance of each indicator 34 from shoulder 28, a precise determination as to the location of this internal edge from the outer surface of the work piece within a given tolerance can be determined.

In FIG. 6 a scope 50 is illustrated. Scope 50 is similar to scope 5 of FIGS. 1-3 in that it includes an image viewing part 14 and a shank 12 formed of optically clear material which in this case is an acrylic material. Scope 50 differs from scope 5 in that its shank 12 does not terminate in an image transmitting part. Instead, a cylindrical sleeve 52 formed of hardened steel or similar metal is fitted over shank 12. Sleeve 52 includes an upper outturned flange 54 which serves as a shoulder for engagement with the outer surface of the work piece into which scope 50 is inserted for measuring or comparative purposes. Sleeve 52 extends beyond the end of shank 12 of the scope and receives an image transmitting part 56. Image transmitting part 56 is preferably formed of an optically clear material similar to the material from which shank 12 and image viewing part 14 of the scope is formed and includes an optical surface 58 angled at 45 degrees to the axis of shank 12 and sleeve 52, and a second optical surface 60 which intersects surface 58 and parallels the axis of the shank and sleeve. Gauging indicators 34 and 36 are located upon optical surface 60 and serve the same function as has been previously described for the indicators 34 and 36 in the embodiment of scope 5. Sleeve 52, because of its hardened composition, is not susceptible to a great degree of wear upon repeated insertions of the scope into cavities of metal work pieces. Also sleeve 52 allows other types and designs of image transmitting part 56 to be utilized with the scope. Additionally, the composition of sleeve 52 is chosen so that its coefficient of expansion is less than shank 12 of the scope, thereby improving the accuracy of the scope.

The scope 62 illustrated in FIG. 7 and scope 64 illustrated in FIG. 8 each includes an adjustable collar 66 which allows the distance between shoulder 28 of the scopes and gauging indicators 34 and 36 to be varied. In FIG. 7 shank 12 of scope 62 is threaded just below image viewing part 14 to receive in threadable cooperation collar 66. By rotating collar 66 relative to shank 12, the distance between shoulder 28, which is the lower surface of collar 66, and indicators 34 and 36 can be varied and thus preset for a specific comparative measurement. Scope 64 shown in FIG. 8 includes a metallic flanged sleeve 68 fitted about shank 12 and fixedly positioned adjacently below image viewing part 14 of the scope. Collar 66 of scope 64 is threaded upon sleeve 68 and is also formed of a metallic composition. Scribed upon the side of shank 12 are a plurality of accurately positioned indicator lines 70. Numbered indicia and reference lines 72 are formed radially about the axis of shank 12 upon the surface of shoulder 28 of collar 66. Upon rotation of collar 66 on sleeve 68 relative to shank 12, the spacing between shoulder 28 of the collar and indicators 34 and 36 will vary. Thus far described, scope 64 is similar in operation to previously described scope 62. By coordinating the location and spacing of lines 70, numbered indicia 72 and the lead of the threaded connection between collar 66 and sleeve 68, the operation of scope 64 can be of a micrometer operation. Thus, the shank 12 of scope 64 can be placed into a bore or similar cavity of a work piece and, while viewing the internal surface of the bore through image viewing part 14, collar 66 can be rotated until suitable alignment of an image within the bore and indicators 34 and 36 is obtained. The scope can then be withdrawn from the bore cavity and the indicia 72 read to indicate a comparative variation in or a measurement of the distance between the internal surface and the outer surface of the cavity of the work piece. For some purposes, it may be desirable to have only one circular indicator instead of the pair 34 and 36 shown for scope 64.

It is to be understood that the invention is not to be limited to the details above given, but may be modified within the scope of the appended claims.

What I claim is:

1. In a scope for viewing the internal surface of a bore or similar cavity formed in a work member having an external wall defining said cavity, said scope including a rod having a viewing end and an image transmitting end, said image transmitting end including means for directing image producing light transmitted from an external source through said rod along the axis thereof onto said internal surface toward said viewing end, said rod including a shoulder spaced from said image transmitting end, the improvement wherein said image transmitting end includes an optical surface paralleling said rod axis through which said internal surface image is viewed, a pair of circular gauging indicators on said optical surface, each indicator lying in a plane paralleling the axis of said rod, one indicator being spacedly located from the other along a direction paralleling the axis of said rod, said space between indicators being selectively determined whereby said cavity internal surface image is viewable between said indicators through said viewing end when the rod is inserted into said cavity with the shoulder thereof abutting said wall member of the cavity.

2. The scope of claim 1 wherein said rod has an outer cylindrical surface extending from said shoulder to said optical surface, said optical surface being inset toward the axis of said rod from said rod cylindrical surface.

3. The scope of claim 2 and a plurality of pairs of said circular gauging indicators, each pair having a first indicator spacedly located from its second indicator in the axial direction of said rod, said pairs of indicators located side by side.

4. The scope of claim 3 wherein said first indicators of said pairs form a transversely oriented row and said second indicators of said pairs form a second transversely oriented row across said optical surface.

5. The scope of claim 4 wherein said first indicators are located at varying distances along the axial dimension of said rod from said rod shoulder.

6. The scope of claim 5 wherein the spacing between first and second indicators of each pair of indicators is equal.

7. The scope of claim 2 wherein said optical surface is flat and parallels said rod axis.

8. The scope of claim 2 wherein said optical surface is arcuate.

9. The scope of claim 8 wherein said optical surface at said indicators parallels said rod outer surface.

10. The scope of claim 1 wherein said image viewing end includes an eyepiece means for viewing said internal surface image through said optical surface, said shoulder constituting a collar encircling said rod below said eyepiece means, means connecting said collar to said rod for movement of the collar relative to said rod toward and away from said optical surface.

11. The scope of claim 10 and indicia means carried by said rod and collar for indicating the amount of movement of said collar toward and away from said optical surface.

12. The scope of claim 1 wherein said image viewing end includes a head having a viewing surface, said image transmitting end including a flat optical surface extending at a 45 degree angle to the axis of said rod, said optical surface paralleling said rod axis, a sight area at said head viewing surface and including boundary means coaxial with said rod axis for directing the line of sight of said scope user along said rod axis when viewing said internal surface image from the image viewing end of said rod.

13. In a scope for viewing the internal surface of a bore or similar cavity formed in a work member having an external wall defining said cavity, said scope including a rod having a viewing end and an image transmitting end, said image transmitting end including means for directing image producing light transmitted from an external source through said rod along the axis thereof laterally onto said internal surface and thereafter reflecting the image of said internal surface toward said viewing end, said rod including a shoulder spaced from said image transmitting end, the improvement wherein said shoulder constitutes a collar encircling said rod spacedly from said image transmitting end, thread means connecting said collar to said rod for selected and specific movement of the collar relative to the rod toward and away from said image transmitting end, said image transmitting end including an optical surface paralleling said rod axis through which said internal surface image is viewed, a circular gauge indicator formed on said optical surface and being visible when viewing said internal surface image through said viewing end, said gauge indicator lying in a plane paralleling the axis of said rod.

14. The scope of claim 13 and indicia means carried by said rod and collar for indicating the amount of movement of said collar toward and away from said image transmitting end.

15. The scope of claim 14 and another circular gauging indicator on said optical surface, said first mentioned indicator being spacedly located from said last mentioned indicator along the axial dimension of said rod with the spacing between said indicators being selectively determined.

* * * * *